Patented Dec. 7, 1937

2,101,398

UNITED STATES PATENT OFFICE 2,101,398

SHELLAC SUBSTITUTE AND PROCESS OF PRODUCING THE SAME

Wilhelm Krumbhaar, Detroit, Mich.

No Drawing. Application April 9, 1936, Serial No. 73,591

7 Claims. (Cl. 134—26)

The invention relates to shellac substitutes and the process of producing the same and the primary object of this invention is to produce a resin that can be used as a substitute for shellac and is better and cheaper than the resins heretofore used for this purpose.

A shellac substitute should be light colored, hard, elastic, polishable, pore-sealing and chemically resistant and the material should be soluble in ethyl alcohol. It is difficult to produce a resin possessing all these properties at the same time and many efforts have been made to solve the problem, either by the use of synthetic materials or natural gums. Synthetic resins which are soluble in ethyl alcohol are expensive to make, are as a rule very brittle and generally have a tendency to cause discoloration in the dried film resulting from their use. Spirit soluble natural gums useable as shellac substitutes, with the soft Manila copal as the main type, have serious disadvantages. They are, for the most part, not completely soluble in alcohol. A slimy and stringy residue remains, part of which finally goes into solution causing high viscosity and thereby affecting the quality of the resulting varnish unfavorably. The dried film of the resin is soft and has poor mechanical and chemical resistance. Besides alcohol soluble natural gums are available only in limited quantities and their price therefore is high.

The major part of the disadvantages just cited are overcome by proceeding according to the present invention, resulting in a cheap alcohol soluble resin, which dries from the solution to a hard, elastic, pore-sealing and polishable film having excellent color, color retention and chemical resistance.

The shellac substitutes according to this invention are made by means of a new variation of the mastication process as described in U. S. Patent No. 2,007,333. This patent discloses a method for making natural gums more soluble and more reactive by a distortion of the gum while in the plastic state, and stresses especially the method of increasing the reactivity of the gums. It is stated that in order to secure the desired effects, temperatures preferably of at least 175° F. should be applied, and that the application of higher temperatures up to 400° F. or even higher for certain grades of copal facilitates chemical reactions.

Further investigation has shown that high temperatures are not an indispensable condition for producing plasticity, but that the plastic state can also be obtained at lower temperatures if increased pressure is applied. In this way the gum does not become hard and brittle even at comparatively low temperatures and a mechanical grinding effect, resulting in pulverizing the gum, is avoided.

Further tests have shown that the temperature of the mastication process has a different effect on the increase of reactivity on the one hand and on the improvement of solubility on the other hand. While the reactivity of the gum is increased by the use of higher temperatures the solubility on the contrary is more efficiently improved by lower temperature. High pressure has been found to be desirable in both cases. High pressure however is essential if the mastication of the gum is to be performed at low temperatures, in order to render the gum plastic, and to avoid grinding and pulverizing effects. It also has been found that low temperature mastication is especially efficient in decreasing viscosity. While the accelerating influence of higher temperature on the reactivity is perfectly in line with general experience, it is on the other hand new and surprising for the expert to find that decrease of temperature during the mastication process influences solubility in the opposite way and promotes the solubilizing effect.

This unexpected discovery forms the basis for the present process of producing shellac substitutes from hard natural gums, especially fossil copals. For this purpose the gums are masticated at temperatures which may be as low as 90–100° F. and preferably not exceeding 120° F. The temperature of 90° F. is about the lowest limit, because at further decreased temperature the necessary power input would be too high to be still practicable. On the other hand 120° F. is about the upper limit in order to obtain the benefit of an increased solubility in ethyl alcohol. Efficient water cooling may be found necessary in order to keep the temperature down to the required point.

In order to start and carry through the mastication at low temperatures a high pressure preferably 80–100 pounds per square inch should be exerted on the batch. The lowest practical limit of the pressure necessary to produce plasticity under the conditions of cold mastication is about 50 pounds per square inch. Pressures higher than 150 pounds are seldom desirable and hardly practicable. The power consumption under such conditions is comparatively high and varies according to the size and nature of the batch as well as the type of machine used. In case the low temperature mastication is preferred in heavy mixer and kneading type machines the resulting material may be somewhat heterogeneous and in such event should be given an after treatment on closely spaced rolls in order to homogenize it.

The time factor is of special importance in cold mastication. Soft copals are made soluble quickly, usually in about 15 minutes, medium hard gums require up to one hour and very hard gums need up to two hours or more.

The most important feature of a shellac substitute is solubility in ethyl alcohol and it is this property that is imparted to natural gums, especially hard copals by the new cold mastication process. Solubility in practically all proportions may be obtained.

The method of Patent No. 2,007,333 makes copals soluble in high molecular alcohols, such as propyl, butyl and amyl alcohol, but does not create practically sufficient solubility in the ordinary ethyl alcohol, which of course is of paramount commercial importance. Accordingly the new method tends to revolutionize the practice of making spirit varnishes as a whole.

According to the disclosure of Patent No. 2,007,333 moreover, the viscosity of the copal solutions is lowered by extending the time and increasing the pressure of the mastication. By the new cold mastication process it can be brought down to exceptionally low consistencies, resulting in coating compositions of unusually good workability, flow, gloss and pore-sealing features.

The possibility of very efficiently lowering the viscosity of spirit solutions of copals by cold mastication is of special importance for the improvement of the soft Manila copal which is used industrially to a considerable extent as a shellac substitute. While this copal is more or less spirit soluble in itself, the solutions thereof in ethyl alcohol are highly viscous and often have a stringy character which makes them impracticable. After cold mastication the soft Manila copal yields easily workable spirit varnishes. For instance a spirit soluble Manila copal which gives a 50% ethyl alcohol solution of the viscosity S in the Gardner-Holt scale will yield after cold mastication a 50% solution of viscosity D.

Among the hard copals useful for making shellac substitutes by way of cold mastication the most important commercially is the Congo copal. This copal is available in huge quantities at low prices; it has been used for oleo resinous varnishes on a large scale and will now, after having been made spirit soluble by the process of this invention, open up a vast new field for spirit varnishes.

Other suitable copals are hard Manila, pontianak, Benguella.

Instead of using straight ethyl alcohol in making solutions of the natural gums, mixtures thereof with higher alcohols can be employed. As a rule the mixtures yield solutions of lower viscosity than do straight alcohols, which in most cases is a desirable feature. It means easy filtering and cleaning of the solutions and good workability of the spirit varnish.

It will be evident to those skilled in the art that other light or high boiling solvents or diluents, also plasticizers or other agents to impart resilience, may be added.

It is also evident that the method of cold mastication may be followed by hot mastication, if in addition to good solubility high reactivity is desired.

The invention will be more fully understood by the following examples:

*Example 1.*—100 parts of hard Manila copal are masticated for one hour at 110° F. under 80 pounds' pressure. The resulting mass is broken up into small pieces and dissolved in 20 parts of butanol and 100 parts of ethyl alcohol, by stirring in an agitator at room temperature. After solution is completed it is filtered in the usual way.

*Example 2.*—100 parts of light colored Congo copal are masticated in a heavy mixer type machine for two hours at 120° F. under 90 pounds' pressure and sufficient water cooling to take care of interior frictional heat evolved during mastication. The mass is then put through calender rolls for homogenizing, and dissolved in 100 parts of commercial ethyl alcohol at room or elevated temperature.

*Example 3.*—100 parts of medium grade Benguella copal are masticated for three-quarters of an hour at 100° F. and 80 pounds' pressure. The final product is dissolved in 60 parts each of ethyl and isopropyl alcohol by heating under a reflux condenser. After the solution is complete it is left standing for two days, after which time it has clarified itself.

*Example 4.*—100 parts of soft Manila copal are masticated for 15 minutes at 90° F. under pressure of 75 pounds. After this operation the product is completely soluble in ethyl alcohol giving very low viscous solutions.

The resinous material obtained by the process of this invention is a very suitable substitute for shellac, in all those applications where shellac is used for making surface coating materials. The product dissolves with low viscosity in commercial alcohol without any residue, the solution dries to a hard and elastic film, which does not discolor by the influence of light. The film seals the pores of wood very satisfactorily and takes on an easy and quick polish with high gloss. The coating obtained from the drying solution is completely tackfree and has exceptionally high water and chemical resistance due to the fact that the base material is a gum fossilized and petrified during a long period of time.

The low viscosity of the shellac substitute makes it especially suitable for brushing, spraying and dipping varnishes. It also imparts high solid content to the solutions with the result that combinations with pigments give glossy, easily workable and well flowing paints and enamels.

Moreover the material is useful for all those purposes where shellac or shellac substitutes are used for making impregnating, adhesive, stiffening and waterproofing compositions.

What I claim is:

1. A process for improving copal gums which comprises exerting a pressure of 50–150 pounds per square inch upon a batch of the gum to render the same soft and plastic, and masticating said gum while soft and plastic while maintaining a temperature substantially within the range of 90°–120° F.

2. A process as set forth in claim 1, wherein a soft copal is treated, the pressure exerted on the batch is approximately 75 pounds per square inch and the mastication is continued for approximately 15 minutes.

3. A process as set forth in claim 1, wherein a medium copal is masticated for approximately one hour.

4. A process as set forth in claim 1, wherein hard Congo copal is masticated in a heavy mixer type machine for about two hours at approximately 120° F. under pressure of approximately 90 pounds per square inch.

5. A shellac substitute soluble in ethyl alcohol produced by masticating a copal gum at a temperature within the range of 90-120° F. under a pressure within the range of 50-150 pounds per square inch.

6. A shellac substitute as set forth in claim 5, which is derived from a hard copal.

7. A low viscosity solution adapted for use in varnishes, enamels, paints or the like, or for impregnating, adhesive stiffening or water-proofing compositions, comprising a masticated copal gum, substantially completely dissolved in ethyl alcohol, the mastication being carried out at a temperature within the range of 90°-120° F. and under a pressure of from 50-150 pounds per square inch.

WILHELM KRUMBHAAR.